United States Patent
Honda et al.

(10) Patent No.: US 8,675,106 B2
(45) Date of Patent: Mar. 18, 2014

(54) IMAGE PROCESSING APPARATUS AND CONTROL METHOD FOR THE SAME

(75) Inventors: Yoshiaki Honda, Inagi (JP); Hiroshi Ogino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/561,665

(22) Filed: Jul. 30, 2012

(65) Prior Publication Data
US 2013/0038762 A1 Feb. 14, 2013

(30) Foreign Application Priority Data

Aug. 9, 2011 (JP) .................................. 2011-174254

(51) Int. Cl.
*H04N 9/083* (2006.01)
(52) U.S. Cl.
USPC ......................................................... 348/273
(58) Field of Classification Search
USPC ................. 348/241, 242, 246, 247, 272, 273, 348/278–281
See application file for complete search history.

(56) References Cited

U.S. PATENT DOCUMENTS

| | | | |
|---|---|---|---|
| 5,629,734 A * | 5/1997 | Hamilton et al. | 348/222.1 |
| 7,256,828 B2 * | 8/2007 | Nilsson et al. | 348/273 |
| 7,570,288 B2 | 8/2009 | Hasegawa et al. | |
| 7,825,965 B2 * | 11/2010 | Achong et al. | 348/246 |
| 7,929,032 B2 * | 4/2011 | Tajima et al. | 348/246 |
| 8,150,154 B2 * | 4/2012 | Kang et al. | 382/167 |
| 2005/0002046 A1 | 1/2005 | Verbeek et al. | |
| 2008/0253652 A1 | 10/2008 | Gupta et al. | |
| 2009/0096899 A1 | 4/2009 | Quan | |
| 2010/0091143 A1 | 4/2010 | Hara | |
| 2011/0074984 A1 | 3/2011 | Terasawa | |

FOREIGN PATENT DOCUMENTS

JP 11-220661 8/1999

OTHER PUBLICATIONS

U.S. Appl. No. 13/561,578, filed Jul. 30, 2012, Yoshiaki Honda, et al.

* cited by examiner

*Primary Examiner* — Timothy J Henn
(74) *Attorney, Agent, or Firm* — Cowan, Liebowitz & Latman, P.C.

(57) ABSTRACT

A direction in which pixels highly correlated with a signal value of a pixel of interest exist is determined by using both signal values of a plurality of pixels of different colors from the pixel of interest and of a plurality of pixels of the same color as the pixel of interest among a plurality of peripheral pixels of the pixel of interest, and obtains pixel correction values corresponding to the respective directions. Weighted addition of those pixel correction values is performed in accordance with the degree to which the pixel of interest is of an achromatic color, and the pixel correction value for the pixel of interest is thus obtained.

8 Claims, 9 Drawing Sheets

IMAGE PROCESSING APPARATUS AND CONTROL METHOD FOR THE SAME

BACKGROUND OF THE INVENTION

1. Field of the Invention

The present invention relates to an image processing apparatus and a control method therefor, and, more particularly, relates to an image processing apparatus for processing a captured image and a control method therefor.

2. Description of the Related Art

A solid-state image sensor such as a CCD has several million or more pixels, and it is therefore difficult to eliminate pixels from which normal output signals cannot be obtained (defective pixels). However, since output signals from the defective pixels cannot be used as they are, defective pixel correction, in which predicted values obtained from output signals of peripheral normal pixels are used as the output signals of those defective pixels, is performed (Japanese Patent Laid-Open No. 11-220661).

Although various methods for obtaining a predicted value (pixel correction value) from output signals of peripheral normal pixels are known, a typical one will be described here. FIG. 11A is a diagram showing a part of the pixels in an image sensor having a so-called Bayer-pattern primary color filter, in which red (R) pixels, green (G) pixels, and blue (B) pixels are regularly arranged; the red pixel R33 at the center is assumed to be a defective pixel.

First, absolute differences are found between the output values of pixel pairs located in the vertical direction, the horizontal direction, the 45-degree direction, and the 135-degree direction respectively relative to the defective pixel among the peripheral pixels (B22, G23, B24, G34, B44, G43, B42, and G32) of the defective pixel. Specifically, suppose the absolute difference for the horizontal direction is H_DIV, the absolute difference for the vertical direction is V_DIV, the absolute difference for the 45-degree direction is D45_DIV, and the absolute difference for the 135-degree direction is D135_DIV. Then, the following are calculated:

$$H\_DIV = ABS(G32 - G34)$$

$$V\_DIV = ABS(G23 - G43)$$

$$D45\_DIV = ABS(B24 - B42)$$

$$D135\_DIV = ABS(B22 - B44)$$

Then, the direction of the smallest absolute difference is determined to be the direction in which pixels highly correlated with the pixel of interest exist. An average value of the output values of a pair of the pixels of the same color as the defective pixel, which are located to sandwich the defective pixel in the determined direction, is used as a pixel correction value for the defective pixel.

That is, suppose the pixel correction value is Pix, and then:
If H_DIV is the smallest: Pix=(R31+R35)/2
If V_DIV is the smallest: Pix=(R13+R53)/2
If D45_DIV is the smallest: Pix=(R15+R51)/2
If D135_DIV is the smallest: Pix=(R11+R55)/2

However, in this method, the direction determination is performed by using only the signal values of the eight peripheral pixels surrounding the pixel of interest. Therefore, a problem arises in that if any influence from noise or the like is contained in the signal values of the eight peripheral pixels, an error may occur in direction determination, and as a result, the accuracy of pixel correction values is reduced.

SUMMARY OF THE INVENTION

The present invention was made in consideration of such problems found in the conventional technique, and provides an image processing apparatus capable of more stably obtaining accurate direction determination results, and a control method therefor.

According to the first aspect of the present invention, there is provided an image processing apparatus for generating a signal value of a pixel of interest in an image, which is captured by an image sensor having a color filter, from signal values of a plurality of peripheral pixels of the pixel of interest, comprising: a determination unit adapted to output a determination signal indicating a degree to which the pixel of interest is of an achromatic color based on a chroma signal corresponding to the pixel of interest; an achromatic color direction determination unit adapted to determine a direction, in which a pixel highly correlated with the signal value of the pixel of interest exists, from the signal values of a plurality of pixels of a different color from the pixel of interest among the plurality of peripheral pixels of the pixel of interest; a first correction value generation unit adapted to generate the signal value of the pixel of interest by using a signal value of a pixel that exists in the direction determined by the achromatic color direction determination unit among the plurality of peripheral pixels of the pixel of interest; a chromatic color direction determination unit adapted to determine a direction, in which a pixel highly correlated with the signal value of the pixel of interest exists, from signal values of a plurality of pixels of the same color as the pixel of interest and signal values of a plurality of pixels of a different color from the pixel of interest among the plurality of peripheral pixels of the pixel of interest; a second correction value generation unit adapted to generate the signal value of the pixel of interest by using a signal value of a pixel that exists in the direction determined by the chromatic color direction determination unit among the plurality of peripheral pixels of the pixel of interest; and a weighted addition unit adapted to perform weighted addition of the signal value generated by the first correction value generation unit and the signal value generated by the second correction value generation unit such that a weight of the signal value generated by the first correction value generation unit is larger and a weight of the signal value generated by the second correction value generation unit is smaller as the degree to which the pixel of interest is of an achromatic color indicated by the determination signal is higher, and calculating a final signal value of the pixel of interest.

According to the second aspect of the present invention, there is provided an image capture apparatus comprising: an image sensor having a color filter; and the image processing apparatus according to the first aspect of the present invention, wherein in an image captured by the image sensor, a signal value of a defective pixel in the image sensor is acquired by the image processing apparatus.

According to the third aspect of the present invention, there is provided an image capture apparatus comprising: an image sensor having a color filter; and the image processing apparatus according to the first aspect of the present invention, wherein the signal value calculated by the weighted addition unit in the image processing apparatus is used in color interpolation processing on a pixel of interest in an image captured by the image sensor.

According to the fourth aspect of the present invention, there is provided a method for controlling an image processing apparatus for generating a signal value of a pixel of interest in an image, which is captured by an image sensor having a color filter, from signal values of a plurality of peripheral pixels of the pixel of interest, the method comprising: a determination step of outputting a determination signal indicating a degree to which the pixel of interest is of an achromatic color based on a chroma signal corresponding to the pixel of interest; an achromatic color direction determination step of determining a direction, in which a pixel highly correlated with the signal value of the pixel of interest exists, from the signal values of a plurality of pixels of a different color from the pixel of interest among the plurality of peripheral pixels of the pixel of interest, a first correction value generation step of generating the signal value of the pixel of interest by using a signal value of a pixel that exists in the direction determined in the achromatic color direction determination step among the plurality of peripheral pixels of the pixel of interest, a chromatic color direction determination step of determining a direction, in which a pixel highly correlated with the signal value of the pixel of interest exists, from signal values of a plurality of pixels of the same color as the pixel of interest and signal values of a plurality of pixels of a different color from the pixel of interest among the plurality of peripheral pixels of the pixel of interest; a second correction value generation step of generating the signal value of the pixel of interest by using a signal value of a pixel that exists in the direction determined in the chromatic color direction determination step among the plurality of peripheral pixels of the pixel of interest; and a weighted addition step of performing weighted addition of the signal value generated in the first correction value generation step and the signal value generated in the second correction value generation step such that a weight of the signal value generated in the first correction value generation step is larger and a weight of the signal value generated in the second correction value generation step is smaller as the degree to which the pixel of interest is of an chromatic color indicated by the determination signal is higher, and calculating a final signal value of the pixel of interest.

Further features of the present invention will become apparent from the following description of exemplary embodiments, with reference to the attached drawings.

DESCRIPTION OF THE EMBODIMENTS

Exemplary embodiments of the present invention will now be described in detail in accordance with the accompanying drawings.

First Embodiment

Figure 1:
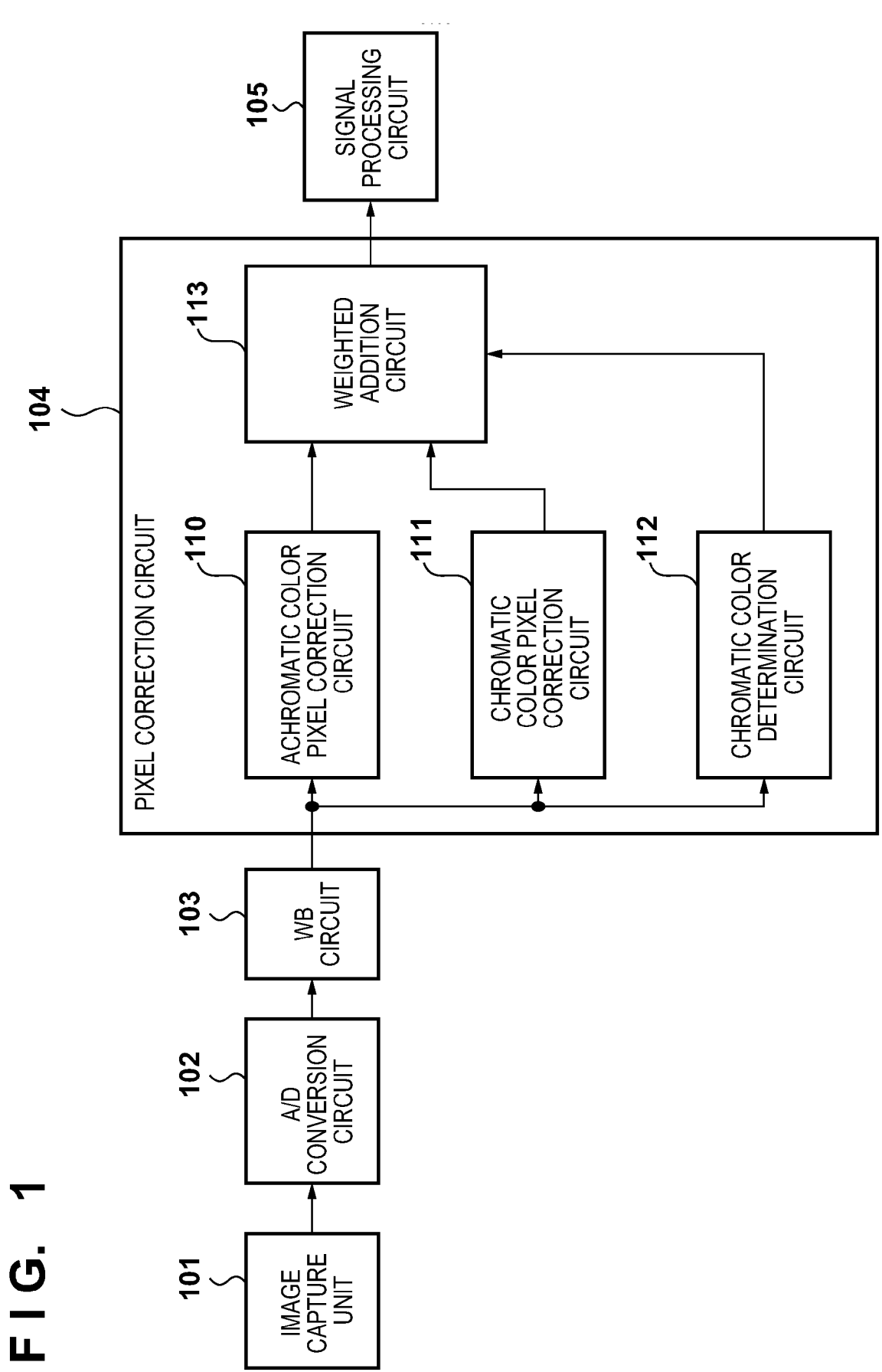
FIG. 1 is a block diagram showing an exemplary functional configuration of an image capture apparatus serving as an exemplary apparatus to which an image processing apparatus according to the first embodiment of the present invention can be applied.

FIG. 1 is a block diagram showing an exemplary functional configuration of an image capture apparatus serving as an exemplary apparatus to which an image processing apparatus according to an embodiment of the present invention can be applied. Note that FIG. 1 shows, among components of the image capture apparatus, only the components associated with defective pixel correction. Also, the components related to image capturing are not essential in the image processing apparatus, according to the present invention.

Note that the functional block of a pixel correction circuit 104 described below may be implemented by computer executing software or by hardware logic. The image processing apparatus according to the present embodiment may be implemented by, for example, a CPU executing a control program to control hardware such as a storage device, or an interface provided in a general computer.

Figures 11A, 11B, 11C, 11D, 11E:
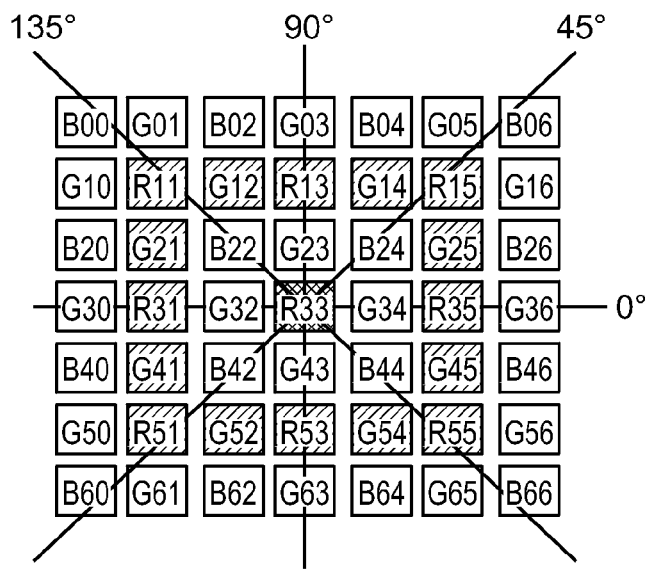
FIGS. 11A to 11E are diagrams for explaining direction determination processing and pixel correction value generation processing according to the first embodiment of the present invention.

In FIG. 1, an image capture unit 101 has a photographing lens, an image sensor, and a drive circuit therefor (which are not shown in the diagram); the image capture unit 101 converts an optical image formed by the photographing lens into an electric signal with the image sensor. A CCD image sensor or a CMOS image sensor, for example, is used as the image sensor, which is provided with a color filter in which a plurality of specific colors are arranged regularly. Here, it is assumed that a Bayer pattern primary color filter shown in FIG. 11A is used as an example of such a color filter. In FIG. 11A, Rxx denotes a red pixel, Gxx denotes a green pixel, and Bxx denotes a blue pixel (xx is a number).

An analog image signal for each pixel output from the image capture unit 101 is converted by an A/D conversion circuit 102 into a digital image signal, and input to a white balance (WB) circuit 103. The WB circuit 103 performs known white balance adjustment on the digital image signal. An image signal output from the WB circuit 103 is input to a pixel correction circuit 104, which corresponds to an image processing apparatus according to the present embodiment.

The pixel correction circuit 104 has an achromatic color pixel correction circuit 110, a chromatic color pixel correction circuit 111, a chromatic color determination circuit 112, and a weighted addition circuit 113. The pixel correction circuit 104 obtains a pixel correction value, which is a predicted value of an image signal of a defective pixel, based on position information on the defective pixel. Specifically, output values of the achromatic color pixel correction circuit 110 and the chromatic color pixel correction circuit 111 are subjected to weighted addition in the weighted addition circuit 113 according to the result of determination by the chromatic color determination circuit 112, and thus the pixel correction value is obtained. The pixel correction value obtained in the pixel correction circuit 104 is input to a signal processing circuit 105. The signal processing circuit 105 is provided with image signals of pixels other than the defective pixel and the pixel correction value, and performs known color interpolation processing, luminance signal processing, color signal processing, and the like.

Note that in the present embodiment, the pixel correction circuit 104 generates a pixel correction value if a pixel of interest (defective pixel) is a red pixel (R pixel) or a blue pixel (B pixel). If the pixel of interest is a green pixel (G pixel), since the number of green pixels (G pixels) is large, direction determination and interpolation using the above-described conventional method can be performed based only on the peripheral green pixels. Processing related to such pixel correction value generation for G pixels is performed by using a correction circuit not shown in the figure (alternatively, the pixel correction circuit 104 may be used).

Note that the pixel correction circuit 104 may also be configured to output signals of pixels other than the defective pixel as they are to the signal processing circuit 105, and, as for the defective pixel, output the obtained pixel correction value to the signal processing circuit 105.

Note that the pixel correction circuit 104 is capable of acquiring, or can acquire in advance, information on correspondence between input image signals and pixel arrangement on the image sensor, and the position of the defective pixel. The method for implementing this is not particularly limited, but, for example, information about the position of the defective pixel in the image sensor included in the image capture unit 101 may be registered in the pixel correction circuit 104, a nonvolatile memory, or the like, that can be accessed by the pixel correction circuit 104 at the time of manufacturing the image capture apparatus or the like. Furthermore, the pixel correction circuit 104 may be notified of position information on the defective pixel via image signals. Also, the arrangement of pixel signals included in image signals input to the pixel correction circuit 104 is determined in advance, and accordingly, peripheral pixels of a specific pixel, or the like, can be specified. Further, it is assumed that information about the arrangement and colors in the color filter is also known in advance. The configuration with which the pixel correction circuit 104 obtains those items is not directly related to the essence of the present invention, and arbitrary known methods may be employed; therefore, any further description thereof will be omitted.

Operation of the Pixel Correction Circuit

Hereinafter, defective pixel correction processing in the pixel correction circuit 104 will be described. Note that in order to help understanding of the present invention and simplify the description, it is assumed here that the pixel of interest (the defective pixel) is a red pixel (R pixel) or a blue pixel (B pixel); a case in which the pixel of interest is an R pixel will be described. However, in the case in which the pixel of interest is a B pixel, the same processing may also be performed by applying the pixel arrangement relationship as described below.

Operation of the Color Determination Circuit

Figure 2:
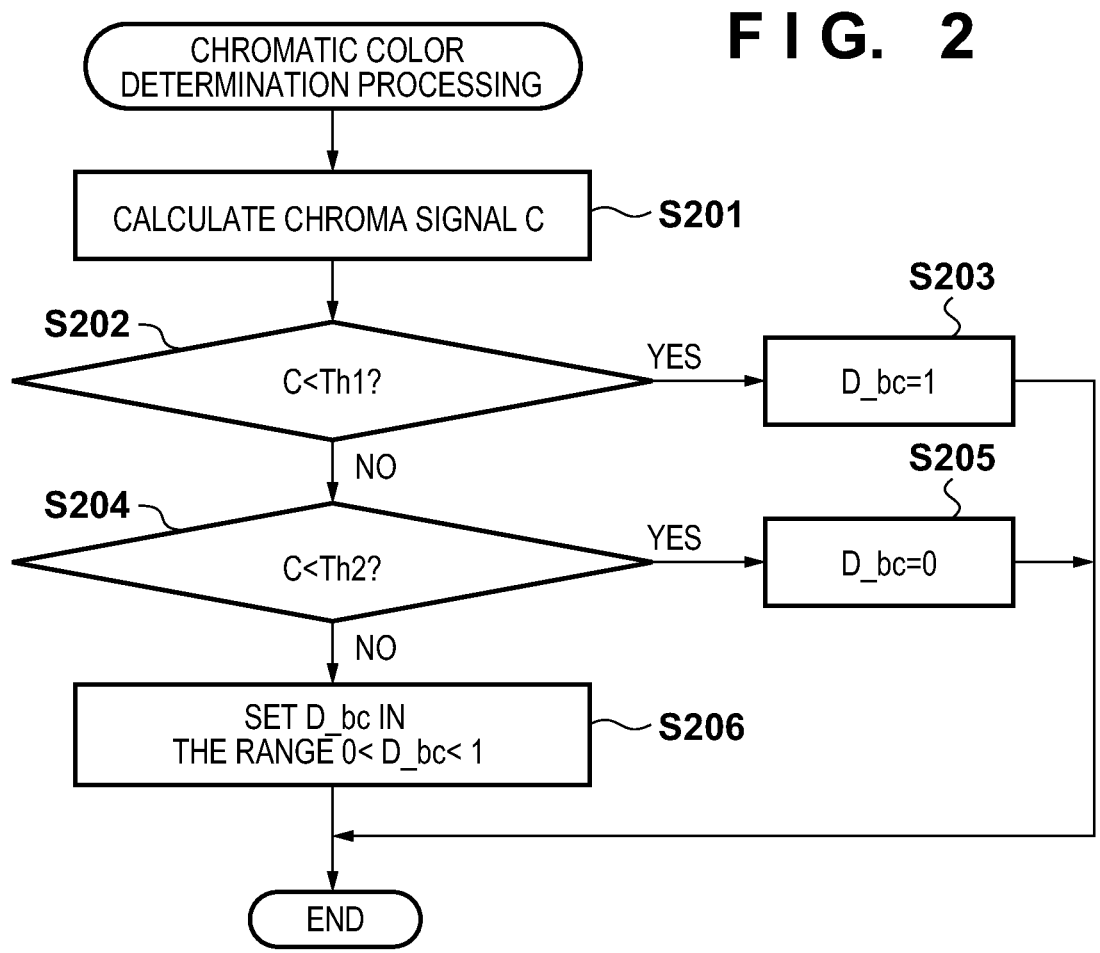
FIG. 2 is a flowchart for explaining the operation of a chromatic color determination circuit in FIG. 1.

Firstly, the operation of the chromatic color determination circuit 112 will be described with reference to the flowchart in FIG. 2. First, in S201, the chromatic color determination circuit 112 calculates a chroma signal C of an image signal after being subjected to white balance processing at the pixel of interest according to, for example, the following expressions;

$$Y=0.3R+0.59G+0.11B$$

$$Cr=0.713(R-Y)$$

$$Cb=0.564(B-Y)$$

$$C=\sqrt{(Cr^2+Cb^2)}$$

Figure 3:
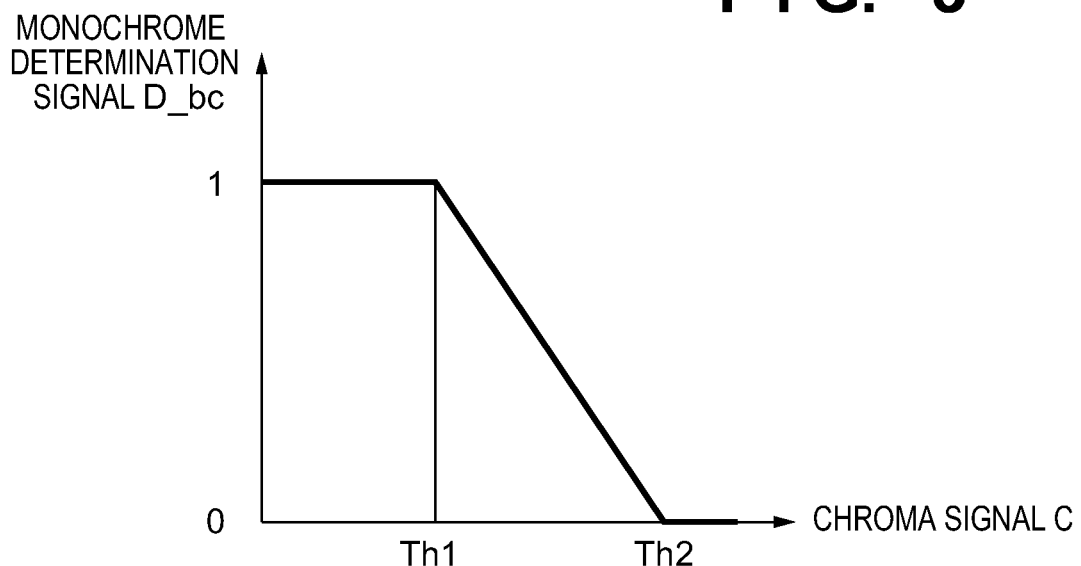
FIG. 3 is a diagram showing an exemplary relationship among a value of a chroma signal C, the thresholds Th1 and Th2, and a value of a monochrome determination signal D be in the first embodiment of the present invention.

The values of R, G, and B at the pixel of interest will be described later. Next, in S202, if the value of the chroma signal C is smaller than the threshold Th1 at a certain level, the chromatic color determination circuit 112 determines that the pixel of interest is of an achromatic color and sets 1 for a monochrome determination signal D_bc (S203). Meanwhile, in S202, if the value of the chroma signal C is equal to or larger than the threshold Th1, the chromatic color determination circuit 112 advances the processing to S204 and compares the value of the chroma signal C with the prescribed threshold Th2 larger than the threshold Th1. If the value of the chroma signal C is larger than the threshold Th2, the chromatic color determination circuit 112 determines that the pixel of interest is of a chromatic color and sets 0 for the monochrome determination signal D_bc (S205). Meanwhile, in S204, if the value of the chroma signal C is equal to or smaller than the threshold Th2, a value obtained by linear interpolation in accordance with the value of the chroma signal C is set for the monochrome determination signal D_bc (S206). FIG. 3 shows an exemplary relationship among the value of the chroma signal C, the thresholds Th1 and Th2, and the value of the monochrome determination signal D_bc.

As described above, the chromatic color determination circuit 112 outputs the monochrome determination signal D_bc of a value "1" if the value of the chroma signal C is smaller than the threshold Th1, and outputs the monochrome determination signal D_bc of a value "0" if the value of the chroma signal C is larger than the threshold Th2. Also, if the value of the chroma signal C is in the range from the threshold Th1 to the threshold Th2, the chromatic color determination circuit 112 outputs the monochrome determination signal D_bc of a value expressed by D_bc=1−(C−Th1)/(Th2−Th1). Thus, the value of the monochrome determination signal D_bc can be considered as indicating a degree to which the pixel of interest is of an achromatic color.

Next, an example of methods for obtaining the R, G, and B values at the pixel of interest to obtain the chroma signal C will be described. FIG. 11B shows a pixel arrangement associated with part of an image signal after being subjected to white balance processing. Here, the red pixel R33 is assumed to be the pixel of interest (i.e., the defective pixel), and R, G, and B at pixel of interest R33 are obtained by using signal values at peripheral pixels of the pixel of interest.

In the present embodiment, the peripheral pixels used to obtain the chroma signal C at the position of the pixel R33 are G21, G41, G25, and G45.

First, the chromatic color determination circuit 112 obtains missing values among the R, G, and B values at the peripheral pixels from the signal values of adjacent pixels. Here, because all peripheral pixels are green pixels, the R and B values are obtained from the signal values of adjacent red and blue pixels.

Suppose the R and B values at the position of the pixel G21 are R_21 and B_21, respectively, and then, the chromatic color determination circuit 112 obtains those values as follows:

$$R\_21=(R11+R31)/2$$

$$B\_21=(B20+B22)/2$$

Similarly, the chromatic color determination circuit 112 also obtains the R and B values at the pixels positions of G41, G25, and G45 as follows:

$$R\_41=(R31+R51)/2$$

$$B\_41=(B40+B42)/2$$

$$R25=(R15+R35)/2$$

$$B\_25=(B24+B26)/2$$

$$R\_45=(R35+R55)/2$$

$$B\_45=(B44+B46)/2$$

Next, the chromatic color determination circuit 112 obtains the respective average values of the R, G, B values at the pixel positions of G21, G41, G25, and G45 as the R, G, and B values at pixel of interest R33. That is, the following expressions are applicable:

$$R\_33=(R\_21+R\_41+R\_25+R\_45)/4$$

$$G\_33=(G21+G41+G25+G45)/4$$

$$B\_33=(B\_21+B\_41+B\_25+B\_45)/4$$

Note that in the present embodiment the peripheral pixels used to obtain the chroma signal C at the position of the pixel R33 are G21, G41, G25, and G45, but a pixel group at other positions may alternatively be used. Further, a configuration in which saturation is normalized based on brightness so as to also detect the saturation in a dark area may be employed. For example, the saturation can be normalized based on brightness by dividing the saturation by luminance Y.

Operation of the Weighted Addition Circuit

Before describing the operation of the achromatic color pixel correction circuit 110 and the chromatic color pixel correction circuit 111, the operation of the weighted addition circuit 113 will be described. Suppose the pixel correction value output by the achromatic color pixel correction circuit 110 is Pix_1, and the pixel correction value output by the chromatic color pixel correction circuit 111 is Pix_2. The weighted addition circuit 113 obtains the final pixel correction value Pix in accordance with the value of the monochrome determination signal D_bc output by the chromatic color determination circuit 112, as follows:

$$Pix=(1-D\_bc)*Pix\_1+D\_bc*Pix\_2$$

Then, the weighted addition circuit 113 outputs the pixel correction value Pix as the image signal of the defective pixel to the signal processing circuit 105.

Achromatic Color Pixel Correction Circuit

Figure 4:
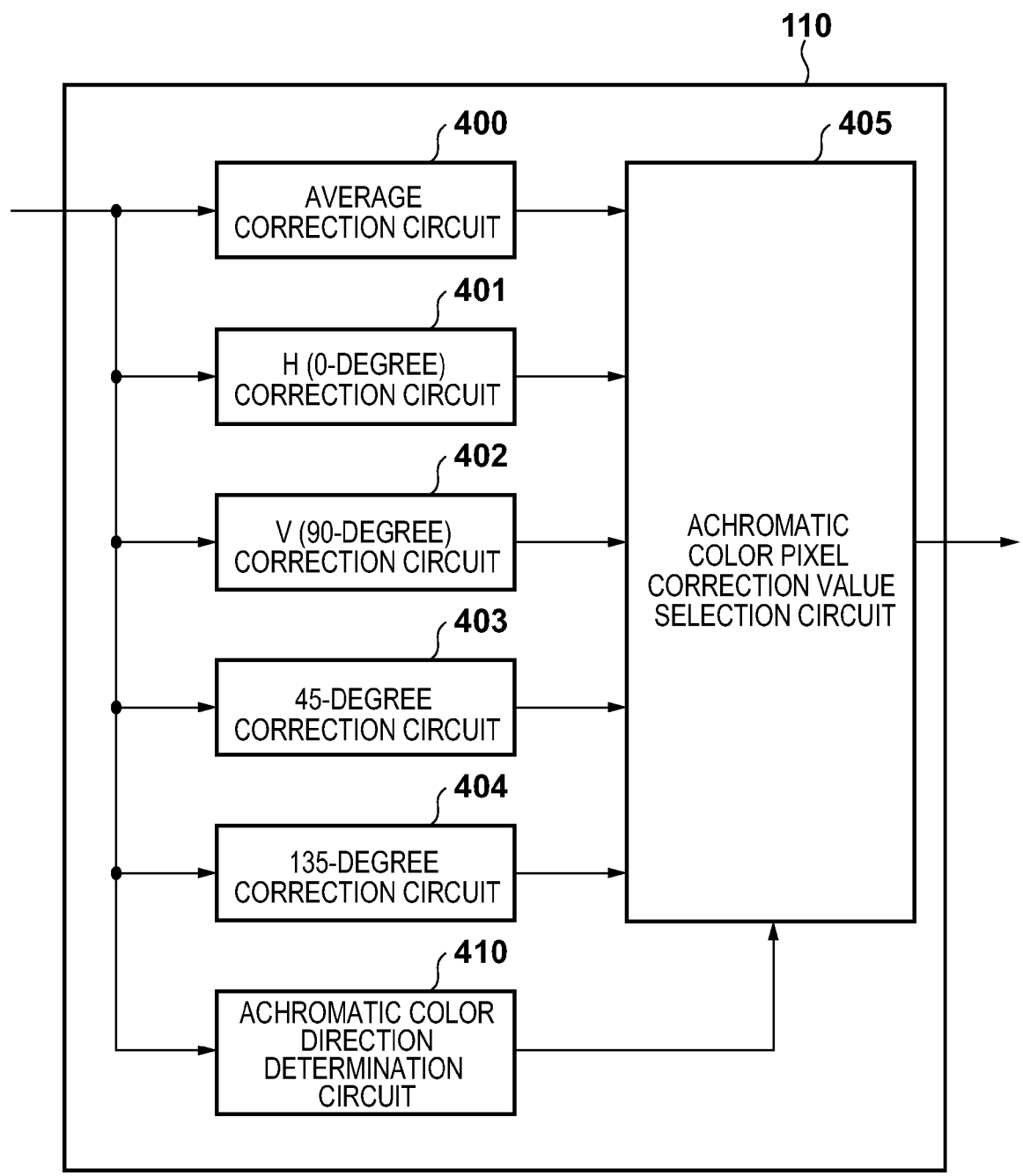
FIG. 4 is a block diagram showing an exemplary functional configuration of an achromatic color pixel correction circuit in FIG. 1.

FIG. 4 is a block diagram showing an exemplary functional configuration of the achromatic color pixel correction circuit 110. An achromatic color direction determination circuit 410 performs direction determination processing for determining the direction in which pixels highly correlated with the pixel of interest (the defective pixel) exist (i.e., the direction in which pixels exist that should be used in calculation of the pixel correction value for the pixel of interest).

An achromatic color pixel correction value selection circuit 405 selects, in accordance with the result of determination by the achromatic color direction determination circuit 410, one of the pixel correction values output by an average correction circuit 400, an H (0-degree) correction circuit 401, a V (90-degree) correction circuit 402, a 45-degree correction circuit 403, and a 135-degree correction circuit 404.

Figure 5:
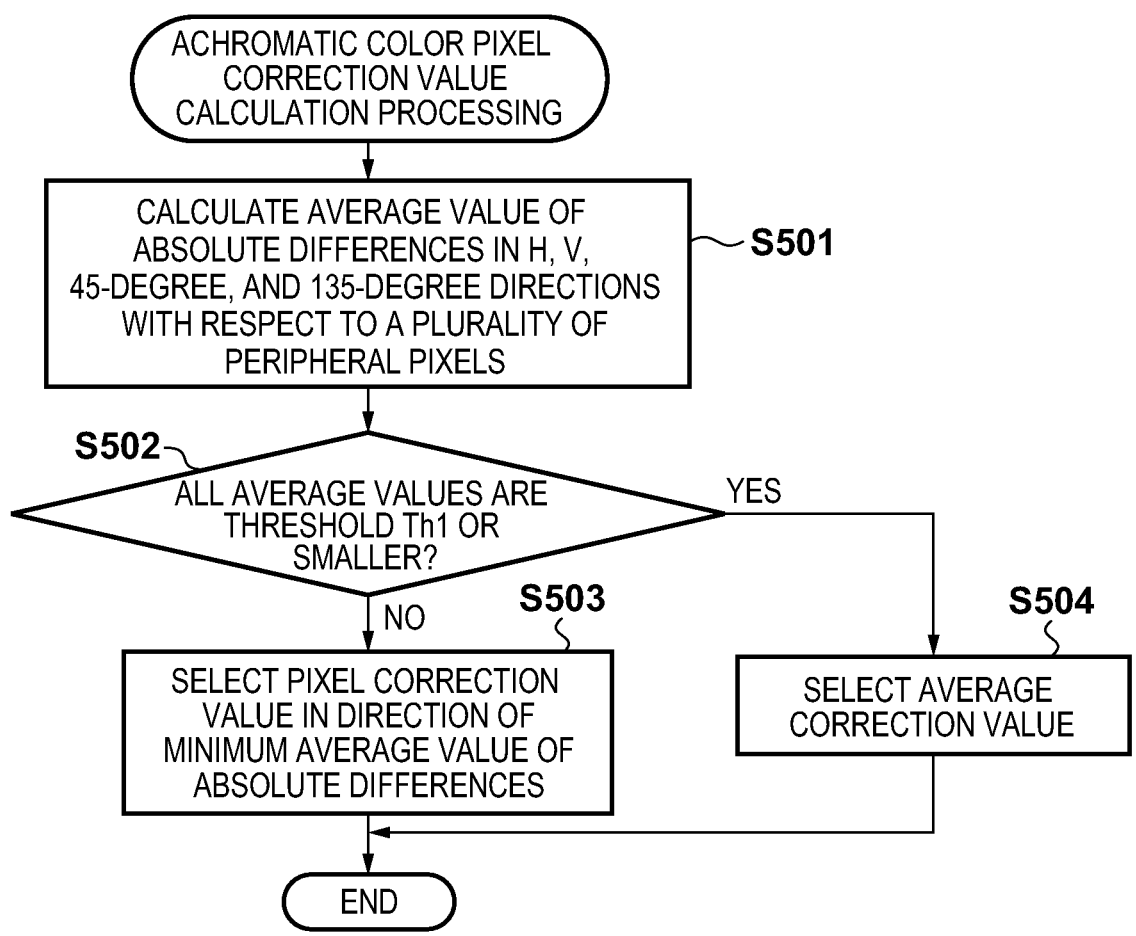
FIG. 5 is a flowchart for explaining the operation of the achromatic color pixel correction circuit in FIG. 1.

Next, the operation of the achromatic color pixel correction circuit 110 will be described using the flowchart in FIG. 5. In the direction determination in the present embodiment, pixel pairs respectively located in the vertical (90-degree) direction, the horizontal (0-degree) direction, the 45-degree direction, and the 135-degree direction relative to the pixel of interest at the center in the pixel arrangement shown in FIG. 11C are selected, and the direction of the selected pixel pair that has the smallest absolute difference between the signal values is the determination result.

In S501, the achromatic color direction determination circuit 410 first calculates the absolute differences between the signal values of pairs of the peripheral pixels located so as to sandwich the pixel of interest in a specific direction (the vertical direction, the horizontal direction, the 45-degree direction, or the 135-degree direction). Here, as shown in FIG. 11C, R11, G12, R13, G14, R15, G21, G25, R31, R35, G41, G45, R51, G52, R53, G54, and R55 are used as the peripheral pixels of the pixel of interest (defective pixel) R33. Next, the achromatic color direction determination circuit 410 obtains the absolute differences for the horizontal direction, the vertical direction, the 45-degree direction, and the 135-degree direction with respect to each peripheral pixel as follows.

Suppose the absolute difference at the pixel R11 for the horizontal direction is H_DIV_11, the absolute difference for the vertical direction is V_DIV_11, the absolute difference for the 45-degree direction is D45_DIV_11, and the absolute difference for the 135-degree direction is D135_DIV_11, and then:

$$H\_DIV\_11=ABS(G10-G12)$$

$$V\_DIV\_11=ABS(G01-G21)$$

$$D45\_DIV\_11=ABS(B02-B20)$$

$$D135\_DIV\_11=ABS(B00-B22)$$

In this case, although H_DIV_11 and V_DIV_11 are obtained by using the signal values of G pixels, and D45_DIV_11 and D135_DIV_11 are obtained by using the signal values of B pixels, the direction determination can be correctly performed. This is because, in the case of an achromatic color subject, the signal values of a G pixel and a B pixel are equal to each other, and therefore both can be regarded as luminance signals. Thus the achromatic color direction determination circuit 410 performs the direction determination by using the equivalent signal values of pixels when considering the subject to be of an achromatic color, and is thereby able to obtain an accurate direction determination result if the subject is actually of an achromatic color.

The achromatic color direction determination circuit 410 similarly obtains the absolute differences for the four directions also with respect to the other peripheral pixels G12, R13, G14, R15, G21, G25, R31, R35, G41, G45, R51, G52, R53, G54, and R55. Finally, the achromatic color direction determination circuit 410 obtains average values of the absolute differences obtained with respect to the respective peripheral pixels for the respective directions.

That is, suppose the average values obtained for the respective directions are H_DIV_AVE, V_DIV_AVE, D45_DIV_AVE, and D135_DIV_AVE, respectively, and then:

$$H\_DIV\_AVE=(H\_DIV\_11+H\_DIV\_12+\ldots+H\_DIV\_55)/16$$

$$V\_DIV\_AVE=(V\_DIV\_11+V\_DIV\_12+\ldots+V\_DIV\_55)/16$$

$$D45\_DIV\_AVE=(D45\_DIV\_11+D45\_DIV\_12+\ldots+D45\_DIV\_55)/16$$

$$D135\_DIV\_AVE=(D135\_DIV\_11+D135\_DIV\_12+\ldots+D135\_DIV\_55)/16$$

In S502, the achromatic color direction determination circuit 410 determines whether or not all average values for the respective directions H_DIV_AVE, V_DIV_AVE, D45_DIV_AVE, and D135_DIV_AVE of the absolute differences at the peripheral pixels are equal to or smaller than the threshold Th1. If all average values of the absolute differences for the respective directions are equal to or smaller than the threshold Th1, the achromatic color direction determination circuit 410 determines that no specific direction exists in which pixels highly correlated with the pixel of interest exist. Then, the achromatic color direction determination circuit 410 outputs a signal for selecting the pixel correction value obtained by the average correction circuit 400 (S504).

The average correction circuit 400 calculates the pixel correction value, Pix, for the pixel R33 as an average value of signal values of the pixels R13, R31, R35, and R53 of the same color as the pixel R33 that appear next (i.e., that are adjacent) in the horizontal direction and the vertical direction, as follows:

$$Pix=(R13+R31+R35+R53)/4$$

Meanwhile, in S502, if at least one of the average values of the absolute differences for the respective directions exceeds the threshold Th1, the achromatic color direction determination circuit 410 advances the processing to S503, and determines the direction of the smallest average value of the absolute differences as the direction in which pixels highly correlated with the pixel of interest exists. The achromatic color direction determination circuit 410 then outputs a signal for selecting the pixel correction value corresponding to the determined direction from among the pixel correction values output by the H (0-degree) correction circuit 401, the V (90-degree) correction circuit 402, the 45-degree correction circuit 403, and the 135-degree correction circuit 404.

That is, the achromatic color direction determination circuit 410 outputs, to the achromatic color pixel correction value selection circuit 405, signals respectively for selecting:
the pixel correction value output by the H (0-degree) correction circuit 401 if H_DIV_AVE is the smallest;
the pixel correction value output by the V (90-degree) correction circuit 402 if V_DIV_AVE is the smallest;
the pixel correction value output by the 45-degree correction circuit 403 if D45_DIV_AVE is the smallest; and
the pixel correction value output by the 135-degree correction circuit 404 if D135_DIV_AVE is the smallest.

The H (0-degree) correction circuit 401, the V (90-degree) correction circuit 402, the 45-degree correction circuit 403, and the 135-degree correction circuit 404 calculate pixel correction values for the pixel of interest from the signal values of pixels existing in a specific direction relative to the pixel of interest at the center. Here, an average value of the signal values of two pixels of the same color as the pixel of interest that exist in a reference direction with the pixel of interest therebetween is obtained as the pixel correction value.

Specifically, suppose that the pixel value after being subjected to pixel correction is Pix, and then,
the H (0-degree) correction circuit 401 calculates Pix=(R31+R35)/2;
the V (90-degree) correction circuit 402 calculates Pix=(R13+R53)/2;
the 45-degree correction circuit 403 calculates Pix=(R15+R51)/2; and
the 135-degree correction circuit 404 calculates Pix=(R11+R55)/2
as the achromatic color pixel correction values for the pixel R33, respectively.

As described above, both signal values of a G pixel and a B pixel can be regarded as luminance signal values with respect to an achromatic color subject, and therefore the direction determination can be correctly performed. Further, the absolute differences for the respective directions at each of a plurality of peripheral pixels (16 in the present embodiment) of the pixel of interest are obtained, and the direction determination is performed based on the average values of the absolute differences for the respective directions; thus it is possible to reduce erroneous direction determination affected by noise.

Note that in the present embodiment, as a method for obtaining the pixel correction value for the defective pixel, a method in which an average value of signal values of the pixels of the same color as the defective pixel that exist in the reference direction with the defective pixel therebetween is calculated has been described. However, pixel correction values obtained by any methods using signal values of pixels existing in the reference direction from the defective pixel may be used. Similarly, the number and position of the peripheral pixels used in the direction determination are not limited to the above-described specific number and position.

Chromatic Color Pixel Correction Circuit

Figure 6:
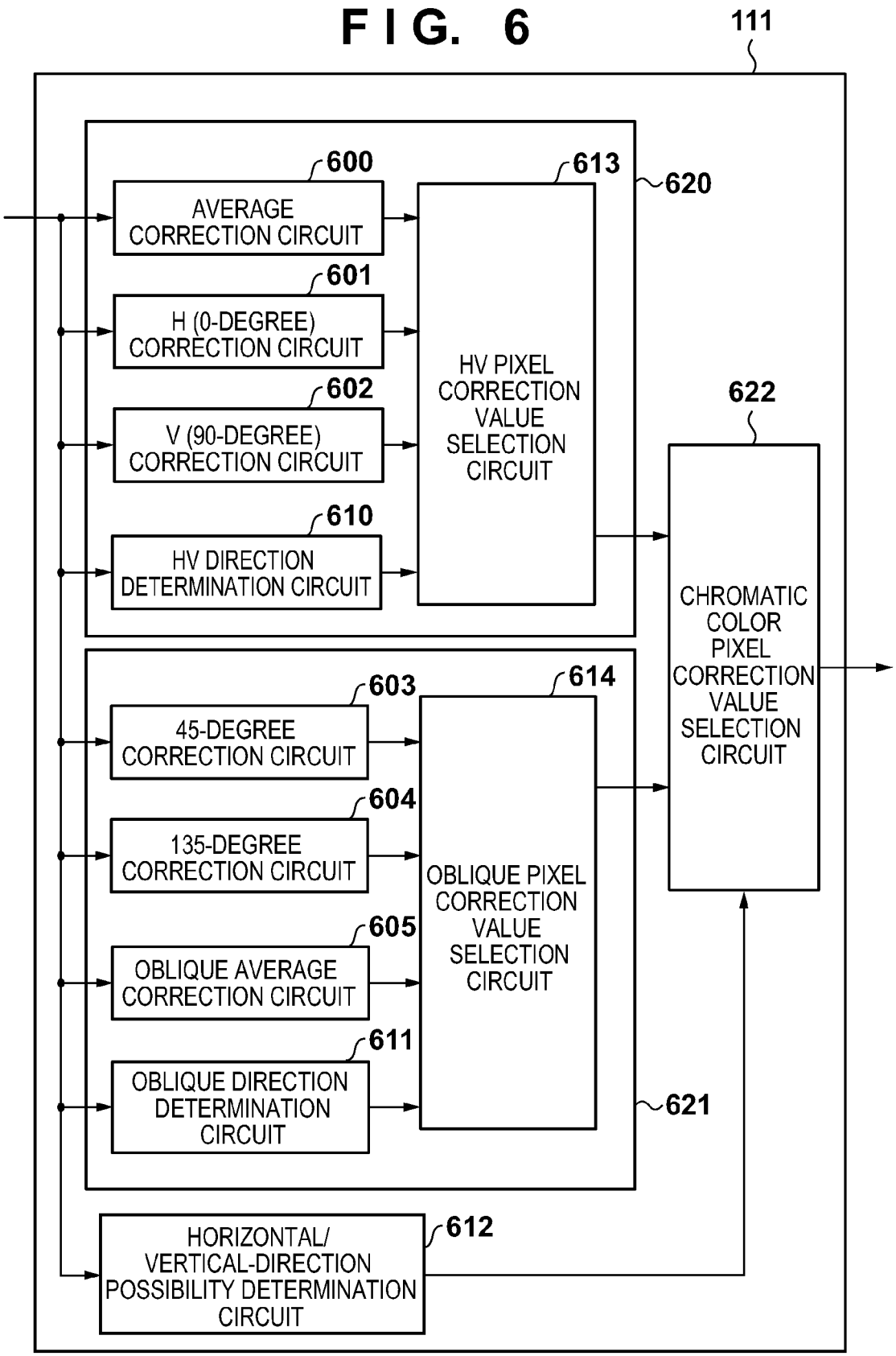
FIG. 6 is a block diagram showing an exemplary functional configuration of a chromatic color pixel correction circuit in FIG. 1.

FIG. 6 is a block diagram showing an exemplary functional configuration of the chromatic color pixel correction circuit 111. A chromatic color pixel correction value selection circuit 622 selects one of the pixel correction value output by a vertical/horizontal pixel correction circuit 620 and the pixel correction value output by an oblique pixel correction circuit 621 in accordance with a result obtained by a horizontal/vertical-direction possibility determination circuit 612, and outputs the selected pixel correction value as the final chromatic color pixel correction value.

The vertical/horizontal pixel correction circuit 620 has an HV direction determination circuit 610, an average correction circuit 600, an H (0-degree) correction circuit 601, a V (90-degree) correction circuit 602, and an HV pixel correction value selection circuit 613. The oblique pixel correction circuit 621 has an oblique direction determination circuit 611, a 45-degree correction circuit 603, a 135-degree correction circuit 604, an oblique average correction circuit 605, and an oblique pixel correction value selection circuit 614. Note that in FIG. 7, the configurations of the average correction circuit 600, the H correction circuit 601, the V correction circuit 602, the 45-degree correction circuit 603, and the 135-degree correction circuit 604 may be the same as those of the blocks 400 to 404 with the same names in FIG. 4, and therefore a detailed description thereof will be omitted.

Horizontal/Vertical-Direction Possibility Determination Circuit

Firstly, the horizontal/vertical-direction possibility determination circuit 612 will be described. As shown in FIG. 11D, when the pixel of interest (the defective pixel) is R33, the horizontal/vertical-direction possibility determination circuit 612 determines the horizontal or vertical-direction possibility from the signal values of the peripheral pixels R11, R13, R15, R31, R35, R51, R53, and R55 of the same color as the pixel of interest. Specifically, the horizontal/vertical-direction possibility determination circuit 612 obtains the absolute difference between the signal values of the peripheral pixels of the same color existing respectively in specific directions (here, the vertical, horizontal, 45-degree, and 135-degree directions) relative to the pixel of interest R33. Here, suppose the absolute difference for the horizontal direction is H_DIV, the absolute difference for the vertical direction is V_DIV, the absolute difference for the 45-degree direction is D45_DIV, and the absolute difference for the 135-degree direction is D135_DIV, and then, the horizontal/vertical-direction possibility determination circuit 612 calculates:

$$H\_DIV = ABS(R31-R35)$$

$$V\_DIV = ABS(R13-R53)$$

$$D45\_DIV = ABS(R15-R51)$$

$$D135\_DIV = ABS(R11-R55)$$

Figure 10:
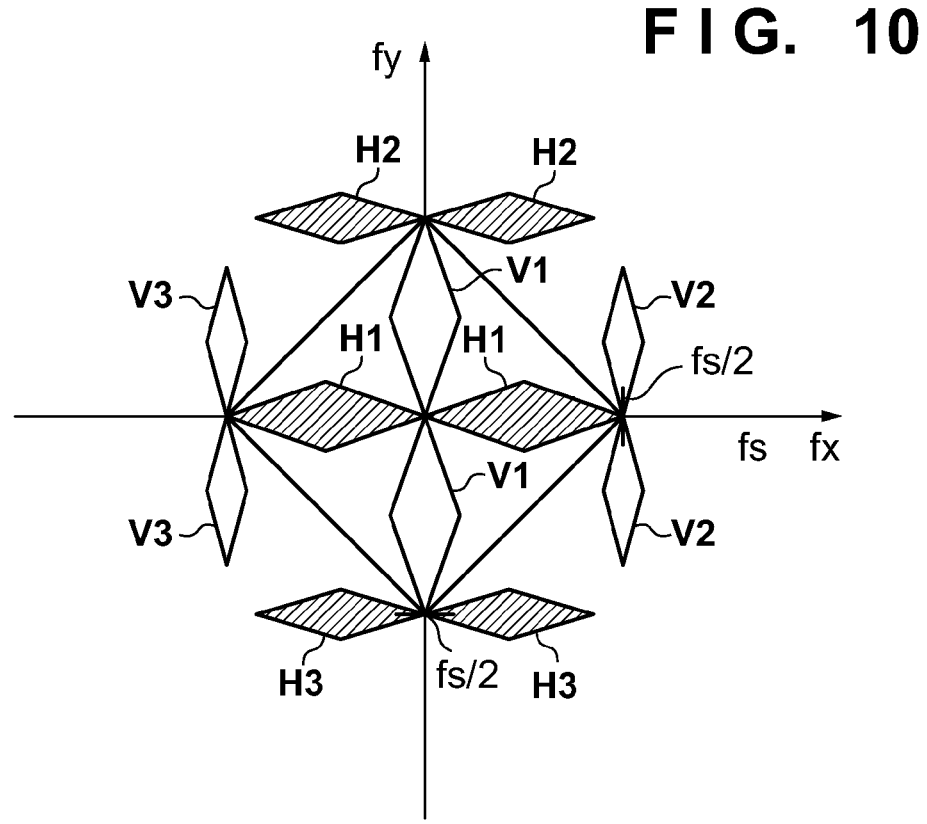
FIG. 10 is a diagram for explaining aliasing effect caused by direction determination using the pixels of the same color as a pixel of interest.

Now the aliasing effect caused by the direction determination using the pixels of the same color as the pixel of interest will be described. FIG. 10 shows a spatial frequency domain, where fs indicates a sampling frequency. Areas V1 and H1 within the Nyquist frequency (fs/2) are not affected by aliasing, and are therefore correctly determined to be in the V direction and the H direction respectively. However, areas V2 and V3, which are actually in the H direction, are determined to be in the V direction due to aliasing. Areas H2 are H3, which are actually in the V direction, are determined to be in the H direction also due to aliasing. Accordingly, in areas H2, H3, V2, and V3, the H (horizontal) direction and the V (vertical) direction cannot be correctly distinguished. In a Bayer pattern color filter, the number of R pixels and B pixels are half the number of G pixels, and therefore, the vertical direction and the horizontal direction cannot be distinguished based on the direction determination using R pixels (B pixels) only. Similarly, 45-degree and 135-degree directions cannot be distinguished either. However, it is possible to find whether the horizontal or vertical direction or the oblique direction based on the direction determination using R pixels (B pixels) only.

Accordingly, the horizontal/vertical-direction possibility determination circuit 612 determines whether the direction in which pixels highly correlated with the pixel of interest exist is the horizontal or vertical direction or the oblique direction—that is, distinguishes the type of direction—from the signal values of the peripheral pixels of the same color as the pixel of interest.

Figure 7:
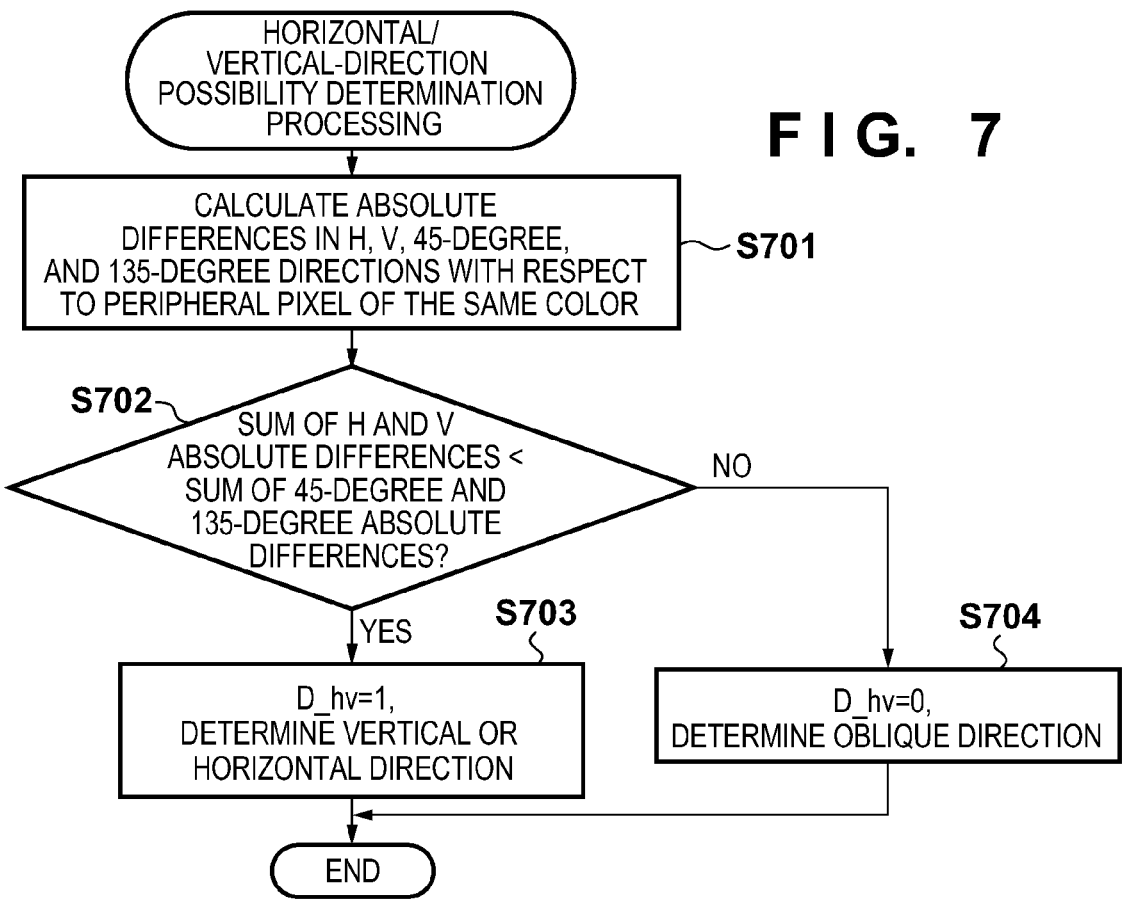
FIG. 7 is a flowchart for explaining the operation of a horizontal/vertical-direction possibility determination circuit in FIG. 6.

Horizontal/vertical-direction possibility determination processing will be described in accordance with the flowchart in FIG. 7. In 5701, the horizontal/vertical-direction possibility determination circuit 612 calculates the absolute difference H_DIV for the horizontal direction, the absolute difference V_DIV for the vertical direction, the absolute difference D45_DIV for the 45-degree direction, and the absolute difference D135_DIV for the 135-degree direction, respectively, as described above. Next, in S702, the horizontal/vertical-direction possibility determination circuit 612 determines whether the direction in which pixels highly correlated with the pixel of interest exist is the horizontal or vertical direction or the oblique direction. Specifically, suppose the sum of the HV absolute differences is HV_DIV and the sum of the oblique absolute differences is D_DIV, and then, the horizontal/vertical-direction possibility determination circuit 612 obtains:

$$HV\_DIV = H\_DIV + V\_DIV$$

$$D\_DIV = D45\_DIV + D135\_DIV$$

Then, if HV_DIV is smaller than D_DIV, the horizontal/vertical-direction possibility determination circuit 612 determines that pixels highly correlated with the pixel of interest exist in the horizontal or vertical direction, and outputs a horizontal/vertical-direction possibility determination signal D_hv having a value "1" (S703). Meanwhile, if HV_DIV is equal to or larger than D_DIV, the horizontal/vertical-direction possibility determination circuit 612 determines that pixels highly correlated with the pixel of interest exist in the oblique direction, and outputs the horizontal/vertical-direction possibility determination signal D_hv having a value "0" to the chromatic color pixel correction value selection circuit 622 (S704).

The chromatic color pixel correction value selection circuit 622 selects and outputs the pixel correction value output by the vertical/horizontal pixel correction circuit 620 if the value of the horizontal/vertical-direction possibility determination signal D_hv is "1", and selects and outputs the pixel correction value output by the oblique pixel correction circuit 621 if the value of the horizontal/vertical-direction possibility determination signal D_hv is "0".

Vertical/Horizontal Pixel Correction Circuit

Figure 8:
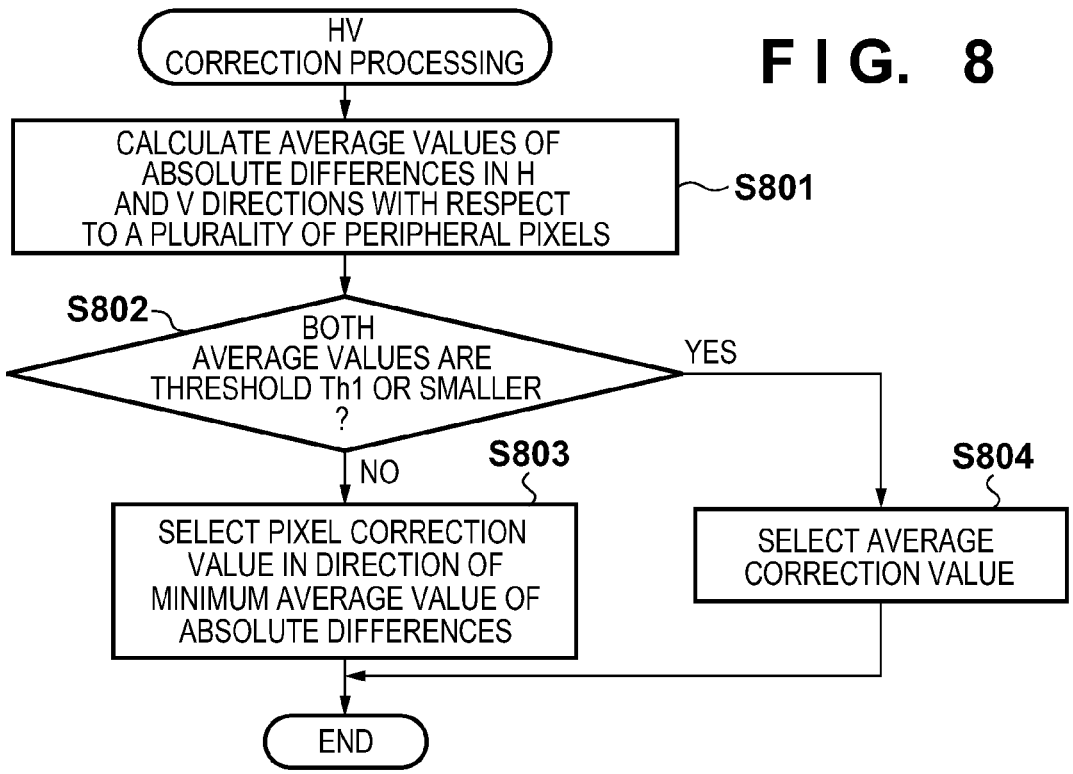
FIG. 8 is a flowchart for explaining the operation of an HV pixel correction circuit in FIG. 6.

Next, the operation of the vertical/horizontal pixel correction circuit 620 will be described in accordance with the flowchart in FIG. 8. The HV direction determination circuit 610 performs the direction determination (determination of whether it is the vertical direction or the horizontal direction) using the signal values of green pixels.

In S801, the HV direction determination circuit 610 calculates the absolute differences of the signal values of green pixels located in the vertical direction and the horizontal direction, with respect to each of a plurality of peripheral pixels of the pixel of interest. For example, in the example shown in FIG. 11D, suppose the absolute difference between the signal values of the green pixels located in the horizontal direction with respect to the peripheral pixel R11 is H_DIV_11, and the absolute difference between the signal values of the green pixels located in the vertical direction is V_DIV_11, and then, the HV direction determination circuit 610 calculates:

$$H\_DIV\_11 = ABS(G10-G12)$$

$$V\_DIV\_11 = ABS(G01-G21)$$

The HV direction determination circuit 610 similarly obtains the absolute differences between the signal values of the green pixels located in the vertical direction and the horizontal direction with respect each of to the peripheral pixels R13, R15, R31, R35, R51, R53, and R55 of the same color as the pixel of interest, and after that, calculates average values according to the respective directions. Suppose the average value for the horizontal direction is H_DIV_AVE, and the average value for the vertical direction is V_DIV_AVE, the HV direction determination circuit 610 calculates:

$$H\_DIV\_AVE = (H\_DIV\_11 + H\_DIV\_13 + \ldots + H\_DIV\_55)/8$$

$$V\_DIV\_AVE = (V\_DIV\_11 + V\_DIV\_13 + \ldots + V\_DIV\_55)/8$$

Next, in S802, the HV direction determination circuit 610 determines whether or not both average values H_DIV_AVE and V_DIV_AVE of the absolute differences for the respective directions calculated in S801 are equal to or smaller than the threshold Th1. If both average values of the absolute differences for the respective directions are equal to or smaller than the threshold Th1, the HV direction determination circuit 610 determines that any specific direction in which pixels highly correlated with the pixel of interest exist does not exist, and outputs a signal for selecting the pixel correction value obtained by the average correction circuit 600 (S804).

Meanwhile, in S802, if at least one of the average values of the absolute differences for the respective directions exceeds the threshold Th1, the HV direction determination circuit 610 advances the processing to S803, and determines the direction of the smaller average value of the absolute differences to be the direction in which pixels highly correlated with the pixel of interest exist. Then, the HV direction determination circuit 610 outputs a signal for selecting the pixel correction value corresponding to the determined direction from among the pixel correction values output by the H (0-degree) correction circuit 601 and the V (90-degree) correction circuit 602. Specifically, the HV direction determination circuit 610 outputs a signal for selecting the pixel correction value of the H (0-degree) correction circuit 601 if H_DIV_AVE is the smaller, and a signal for selecting the pixel correction value output by the V (90-degree) correction circuit 602 if V_DIV_AVE is the smaller.

Oblique Correction Circuit

Figure 9:
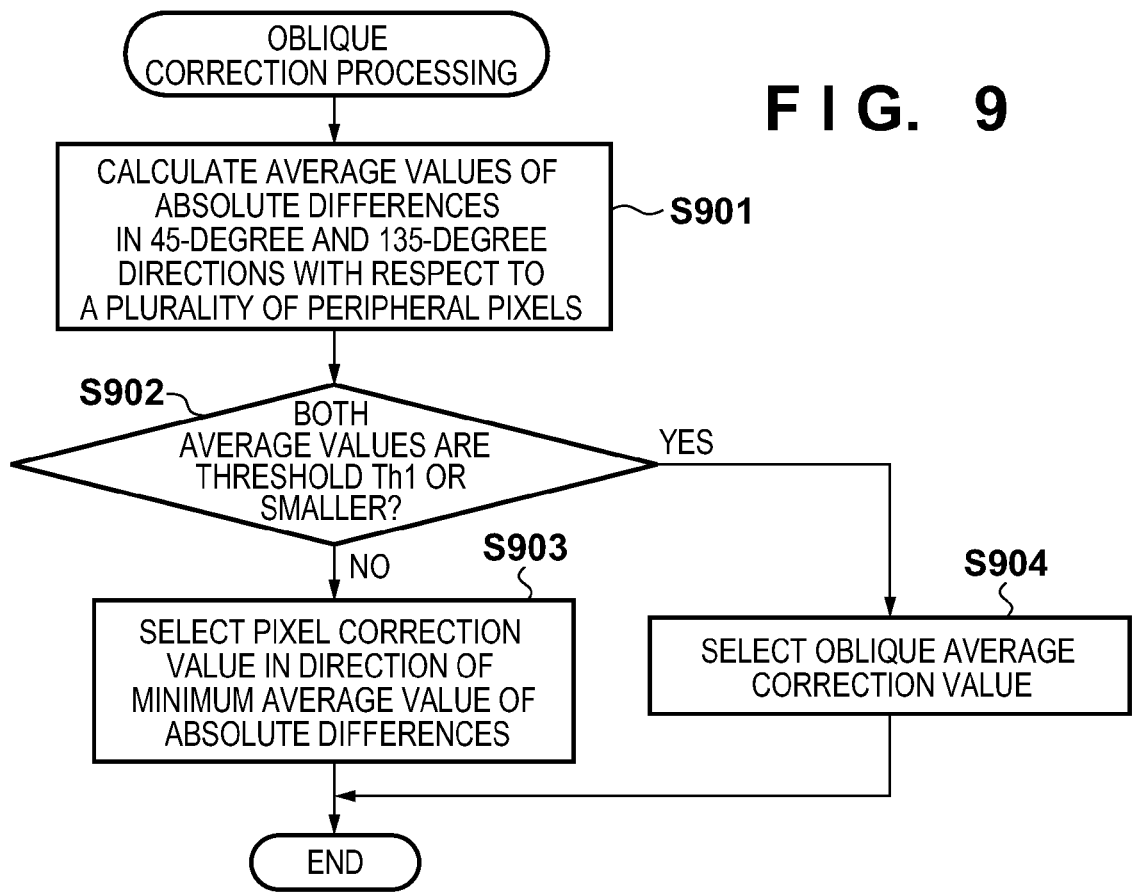
FIG. 9 is a flowchart for explaining the operation of an oblique correction circuit in FIG. 6.

Next, the operation of the oblique pixel correction circuit 621 will be described in accordance with the flowchart in FIG. 9. The oblique direction determination circuit 611 also performs direction determination (however, determination of the 45-degree direction or the 135-degree direction) using the signal values of green pixels. In S901, the oblique direction determination circuit 611 calculates the absolute differences between the signal values of green pixels located in the 45-degree direction and the 135-degree direction with respect to a plurality of peripheral pixels of the pixel of interest. For example, in the example shown in FIG. 11E, suppose the absolute difference between the signal values of the green pixels located in the 45-degree direction with respect to the peripheral pixel G12 is D45_DIV_12, and the absolute difference between the signal values of the green pixels located in the 135-degree direction is D135_DIV_12. In this case, the oblique direction determination circuit 611 calculates:

$D45\_DIV\_12 = ABS(G03-G21)$ $D135\_DIV\_12 = ABS(G01-G23)$

The oblique direction determination circuit 611 similarly obtains the absolute differences between the signal values of the green pixels located in the 45-degree direction and 135-degree direction with respect to each of the other peripheral pixels G14, G21, G25, G41, G45, G52, and G54 shown in FIG. 11E, and after that, calculates the average values for the respective directions. Suppose the average value for the 45-degree direction is D45_DIV_AVE, and the average value for the 135-degree direction is D135_DIV_AVE, and then, the oblique direction determination circuit 611 calculates:

$D45\_DIV\_AVE = (D45\_DIV\_12 + D45\_DIV\_14 + \ldots + D45\_DIV\_54)/8$ $D135\_DIV\_AVE = (D135\_DIV\_12 + D135\_DIV\_14 + \ldots + D135\_DIV\_54)/8$ Next, in S902, the oblique direction determination circuit 611 determines whether both average values D45_DIV_AVE and D135_DIV_AVE of the absolute differences for the respective directions calculated in S901 are equal to or smaller than the threshold Th1. If both average values of the absolute differences for the respective directions are equal to or smaller than the threshold Th1, the oblique direction determination circuit 611 determines that any specific direction in which pixels highly correlated with the pixel of interest exist does not exist, and outputs a signal for selecting the pixel correction value obtained by the oblique average correction circuit 605 (S904).

The oblique average correction circuit 605 calculates the pixel correction value Pix for the pixel R33 as the average value of the signal values of the pixels R15, R51, R11, and R55 of the same color as the pixel R33 that appear next (i.e., that are adjacent) in the 45-degree direction and the 135-degree vertical direction, as below:

$Pix = (R15 + R51 + R11 + R55)/4$

Meanwhile, in S902, if at least one of the average values of the absolute differences for the respective directions exceeds the threshold Th1, the oblique direction determination circuit 611 advances the processing to S903, and determines the direction of the smaller average value of the absolute differences to be the direction in which pixels highly correlated with the pixel of interest exist. Then, the oblique direction determination circuit 611 outputs a signal for selecting the pixel correction value corresponding to the determined direction from among the pixel correction values output by the 45-degree correction circuit 603 and the 135-degree correction circuit 604. Specifically, the oblique direction determination circuit 611 outputs a signal for selecting the pixel correction value output by the 45-degree correction circuit 603 if D45_DIV_AVE is the smaller, and a signal for selecting the pixel correction value output by the 135-degree correction circuit 604 if D135_DIV_AVE is the smaller.

When determining the direction in which pixels highly correlated with the pixel of interest exist, the signal values of the peripheral pixels of the same color as the pixel of interest can be used, but accurate direction determination cannot be always performed on a chromatic color subject due to problems of subject colors and aliasing. Therefore, in the present embodiment, only the type of direction in which pixels highly correlated with the pixel of interest exist is determined from the signal values of the peripheral pixels of the same color as the pixel of interest. The specific direction is determined by using the signal values of the peripheral pixels of different colors from the pixel of interest.

For example, in an image captured by an image sensor having a Bayer pattern color filter, if an R (B) pixel is the pixel of interest (defective pixel), it is determined, from the signal values of peripheral R (B) pixels, whether the direction in which pixels highly correlated with the pixel of interest exist is the horizontal or vertical direction or the oblique direction. Then, it is determined, from the signal values of peripheral G pixels of the pixel of interest, which specific direction the direction in which pixels highly correlated with the pixel of interest exist is.

Therefore, it is possible to reduce the possibility of erroneous direction determination also with respect to a chromatic color subject. Further, even with respect to a subject whose G pixel signal level is small, such as a red subject, it is correctly determined as to whether it is the horizontal or vertical direction, or the oblique direction. Therefore, the possibility of erroneous direction determination using the signal values of G pixels due to noise can also be reduced.

Accordingly, an accurate pixel correction value can be obtained by applying the present invention to the defective pixel correction. Note that the effect of accuracy improvement on direction determination on a chromatic color subject is an effect that can be achieved solely by the chromatic color pixel correction circuit 111.

Note that the method for calculating a pixel correction value after direction determination is not directly related to the essence of the present invention, and arbitrary methods other than the one specifically described above are available.

According to the present embodiment, it is determined whether the subject of the pixel of interest is of achromatic colors or chromatic colors, and if the subject is of achromatic colors, the direction determination is performed by using the signal values of the peripheral pixels, regardless of whether those peripheral pixels are of the same color as or a different color from the pixel of interest. Therefore, it is possible to refer to the signal values of a larger number of peripheral pixels than before with respect to an achromatic color subject, and to thus obtain an accurate direction determination result.

Meanwhile, with respect to a chromatic color subject, the direction determination using the signal values of the peripheral pixels of the same color as the pixel of interest, as well as the direction determination using the signal values of peripheral pixels of different colors from the pixel of interest are performed. Therefore, as described above, it is possible to perform more accurate direction determination than direction determination using only pixels of the same color as the pixel of interest or direction determination using only pixels of different colors from the pixel of interest.

Furthermore, if it is not clear whether a subject is a chromatic color subject or an achromatic color subject, weighted addition of a pixel correction value based on a direction determination result in the case where the subject is regarded as an achromatic color subject, and a pixel correction value based on a direction determination result in the case where the subject is regarded as a chromatic color subject, is calculated in accordance with saturation. Therefore, erroneous correction based on incorrect direction determination can also be reduced.

Second Embodiment

The present invention can be applied to not only generation of a pixel correction value for a defective pixel, but also color interpolation processing on a pixel of interest.

Figure 12:
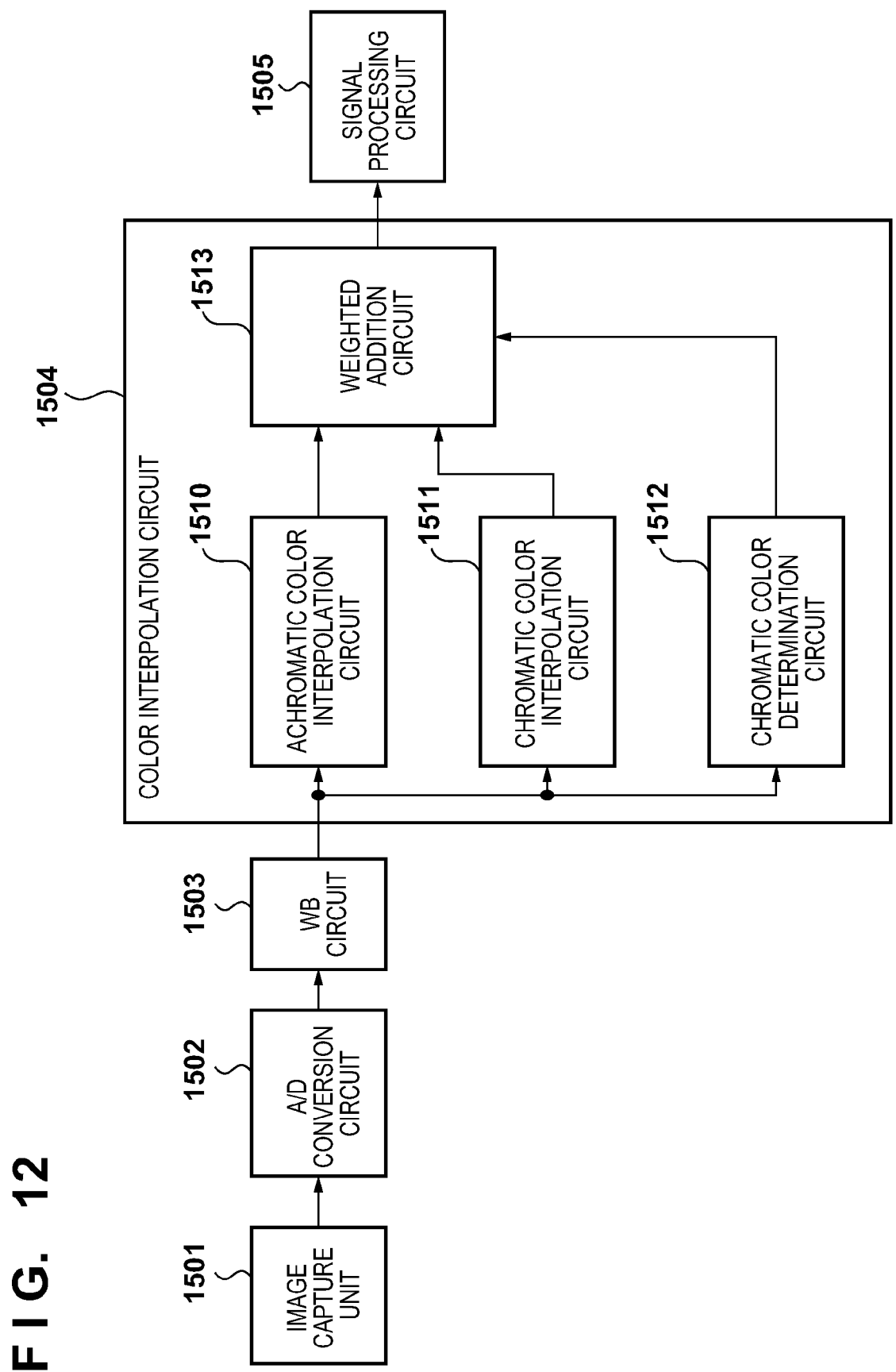
FIG. 12 is a block diagram showing an exemplary functional configuration of an image capture apparatus serving as an example of an apparatus to which an image processing apparatus according to the second embodiment of the present invention can be applied.

FIG. 12 is a block diagram showing an exemplary functional configuration of an image capture apparatus in which an image processing apparatus according to the second embodiment of the present invention is applied to color interpolation processing. In FIG. 12, an image capture unit 1501, an A/D conversion circuit 1502, a WB circuit 1503, and a signal processing circuit 1505 have the same configurations as those in FIG. 1, respectively, and therefore the detailed description thereof will be omitted. A color interpolation circuit 1504 is constituted from an achromatic color interpolation circuit 1510, a chromatic color interpolation circuit 1511, a chromatic color determination circuit 1512, and a weighted addition circuit 1513. Note that the chromatic color interpolation circuit 1511 may be a known color interpolation circuit, and therefore a detailed description thereof will be omitted. Also, the chromatic color determination circuit 1512 and the weighted addition circuit 1513 are the same as those described in the first embodiment, and therefore the detailed description thereof will be omitted. The specific configuration of the achromatic color interpolation circuit 1510 is the same as that shown in FIG. 4, and its operation is also as described with reference to FIG. 5, and therefore a detailed description thereof will be omitted.

The difference from the first embodiment is in whether or not the pixel of interest is a defective pixel. In other words, in the present embodiment the pixel of interest is a normal pixel, and so the signal value of the pixel of interest can be used in the direction determination.

In FIG. 11C, it is assumed that the pixel of interest is the pixel R33 (which is not a defective pixel). Suppose an absolute difference for the horizontal direction at the pixel R11 is H_DIV_11, an absolute difference for the vertical direction is V_DIV_11, an absolute difference for the 45-degree direction is D45_DIV_11, and an absolute difference for the 135-degree direction is D135_DIV_11, and then:

$H\_DIV\_11 = ABS(G10 - G12)$ $V\_DIV\_11 = ABS(G01 - G21)$ $D45\_DIV\_11 = ABS(B02 - B20)$ $D135\_DIV\_11 = ABS(B00 - B22)$

In this case, H_DIV_11 and V_DIV_11 are obtained by using the signal values of G pixels, and D45_DIV_11 and D135_DIV_11 are obtained by using the signal values of B pixels, but the direction determination can be correctly performed. This is because, in the case of an achromatic color subject, signal values of a G pixel and a B pixel are equal signal values to each other, and both can be regarded as luminance signals.

The achromatic color direction determination circuit 410 similarly obtains absolute differences for the four directions also, with respect to other peripheral pixels. The other peripheral pixels are G12, R13, G14, R15, G21, B22, G23, B24, G25, R31, G32, R33, G34, R35, G41, B42, G43, B44, G45, R51, G52, R53, G54, and R55. Lastly, the achromatic color direction determination circuit 410 calculates average values of the absolute differences obtained with respect to the respective peripheral pixels for the respective direction.

In other words, suppose the average values for the respective directions are H_DIV_AVE, V_DIV_AVE, D45_DIV_AVE, and D135_DIV_AVE, and then:

$H\_DIV\_AVE = (H\_DIV\_11 + H\_DIV\_12 + \ldots + H\_DIV\_55)/25$ $V\_DIV\_AVE = (V\_DIV\_11 + V\_DIV\_12 + \ldots + V\_DIV\_55)/25$ $D45\_DIV\_AVE = (D45\_DIV\_11 + D45\_DIV\_12 + \ldots + D45\_DIV\_55)/25$ $D135\_DIV\_AVE = (D135\_DIV\_11 + D135\_DIV\_12 + \ldots + D135\_DIV\_55)/25$ Thus, compared with the first embodiment, in the present embodiment the absolute differences are calculated also with respect to B22, G23, B24, G32, R33, G34, B42, G43, and B44, and the average values of 25 pixels are obtained for the respective directions.

The direction determination processing may be performed similarly to S502 in the first embodiment. Thus, the direction determination by the achromatic color direction determination circuit 410 is more unlikely to be affected by noise. It is possible to use the signal value of the pixel of interest, which cannot be used in the case of the defective pixel correction described in the first embodiment, and therefore, the direction determination can be more correctly performed by using the signal values of pixels near the pixel of interest.

Also, after the direction determination, color interpolation may be performed by using pixels of different colors from the pixel of interest that exist in the determined direction. In this case, color interpolation may be performed in consideration of the signal values of not only the pixels existing in the determined direction, but also other peripheral pixels. For example, weighted addition can be performed such that the weight of the signal values of the pixels peripheral to the pixel of interest that are of one color different in color from the pixel of interest and exist in the determined direction is larger than that of the signal values of the peripheral pixels of the same color not existing in the determined direction.

Other Embodiment

In the above-described embodiment, if the pixel of interest is a G pixel, for example, a pixel correction value may be generated by using the achromatic color pixel correction circuit 110. For example, in FIG. 11D, if G23 is the pixel of interest (defective pixel), the achromatic color direction determination circuit 410 obtains:

$$H\_DIV=ABS(G21-G25)$$

$$V\_DIV=ABS(G03-G43)$$

$$D45\_DIV=ABS(G14-G32)$$

$$D135\_DIV=ABS(G12-G34)$$

Then, the direction of the smallest absolute difference is determined to be the direction in which pixels highly correlated with the pixel of interest exist.

Meanwhile, the H correction circuit 401 calculates the pixel correction value of Pix=(G21+G25)/2, the V correction circuit 402 calculates the pixel correction value of Pix=(G03+G43)/2, the 45-degree correction circuit 403 calculates the pixel correction value of Pix=(G14+G32)/2, and the 135-degree correction circuit 404 calculates the pixel correction value of Pix=(G12+G34)/2.

The achromatic color direction determination circuit 410 outputs a signal for selecting the pixel correction value corresponding to the determined direction to the achromatic color pixel correction value selection circuit 405.

In the above-described embodiment, the case of image data captured by an image sensor having a Bayer pattern color filter has been described. However, the principle of the present invention can be applied to image data captured by an image sensor having an color filter, in which a plurality of specific colors are regularly arranged, and the number of pixels differs depending on color. In other words, the present invention can be applied when generating a pixel correction value for a pixel of a color of which the number of pixels is small.

Further, in the above-described embodiment, the pixel correction values (including average correction values) for the respective directions that can be determined by the HV direction determination circuit 610 and the oblique direction determination circuit 611 are individually calculated by the respective correction circuit. Then, a single pixel correction value is selected in accordance with the result of direction determination by the HV direction determination circuit 610, and a single pixel correction value is selected in accordance with the result of direction determination by the oblique direction determination circuit 611.

However, a correction circuit capable of selectively performing the functions of the average correction circuit 600, the H correction circuit 601, and the V correction circuit 602 may be provided, and a pixel correction value for the horizontal or vertical direction may be generated based on the result of determination by the HV direction determination circuit 610. Similarly, a correction circuit capable of selectively performing the functions of the 45-degree correction circuit 603, the 135-degree correction circuit 604, and the oblique average correction circuit 605 may be provided, and a pixel correction value in the oblique direction may be generated based on the result of determination by the oblique direction determination circuit 611. In those cases, the HV pixel correction value selection circuit 613 and the oblique pixel correction value selection circuit 614 are not necessary.

Further, a configuration in which one of the results of determination by the HV direction determination circuit 610 and the oblique direction determination circuit 611 is selected based on the output of the horizontal/vertical-direction possibility determination circuit 612 is also available. In this case, only the correction value corresponding to the selected determination result may be generated, and accordingly, the chromatic color pixel correction value selection circuit 622 is not necessary either.

Basically, arbitrary configurations may be employed as long as one of the results of determination by the HV direction determination circuit 610 and the oblique direction determination circuit 611 can be selected in accordance with the result of determination of whether the horizontal or vertical direction or the oblique direction by the horizontal/vertical-direction possibility determination circuit 612, and the pixel correction value corresponding to the selected direction can be generated.

Further, in the above-described embodiment, the direction determination is performed for four directions, namely 0-degree, 45-degree, 90-degree, and 135-degree directions, but those directions may be changed depending on the shape and arrangement of the color filter (pixels).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example via a network or from a recording medium of various types serving as a memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-174254, filed on Aug. 9, 2011, which is hereby incorporated by reference herein its entirety.

What is claimed is:

1. An image processing apparatus for generating a signal value of a pixel of interest in an image, which is captured by an image sensor having a color filter, from signal values of a plurality of peripheral pixels of the pixel of interest, comprising:
    a determination unit adapted to output a determination signal indicating a degree to which the pixel of interest is of an achromatic color based on a chroma signal corresponding to the pixel of interest;

an achromatic color direction determination unit adapted to determine a direction, in which a pixel highly correlated with the signal value of the pixel of interest exists, from the signal values of a plurality of pixels of a different color from the pixel of interest among the plurality of peripheral pixels of the pixel of interest;

a first correction value generation unit adapted to generate the signal value of the pixel of interest by using a signal value of a pixel that exists in the direction determined by the achromatic color direction determination unit among the plurality of peripheral pixels of the pixel of interest;

a chromatic color direction determination unit adapted to determine a direction, in which a pixel highly correlated with the signal value of the pixel of interest exists, from signal values of a plurality of pixels of the same color as the pixel of interest and signal values of a plurality of pixels of a different color from the pixel of interest among the plurality of peripheral pixels of the pixel of interest;

a second correction value generation unit adapted to generate the signal value of the pixel of interest by using a signal value of a pixel that exists in the direction determined by the chromatic color direction determination unit among the plurality of peripheral pixels of the pixel of interest; and a weighted addition unit adapted to perform weighted addition of the signal value generated by the first correction value generation unit and the signal value generated by the second correction value generation unit such that a weight of the signal value generated by the first correction value generation unit is larger and a weight of the signal value generated by the second correction value generation unit is smaller as the degree to which the pixel of interest is of an achromatic color indicated by the determination signal is higher, and calculating a final signal value of the pixel of interest.

2. The image processing apparatus according to claim 1, wherein the achromatic color direction determination unit obtains, for each of the peripheral pixels of the pixel of interest, a difference between signal values of two pixels that are of a different color from the pixel of interest and located so as to sandwich the peripheral pixel for a horizontal direction, a vertical direction, and a plurality of predetermined oblique directions, respectively, obtains an average value of the differences for each of the directions, and determines a direction corresponding to a smallest value of the average values obtained for the respective directions to be the direction in which a pixel highly correlated with the signal value of the pixel of interest exists.

3. The image processing apparatus according to claim 1, wherein the chromatic color direction determination unit comprises:

first direction determination unit adapted to determining whether a direction in which a pixel highly correlated with the signal value of the pixel of interest exists is a horizontal or vertical direction or an oblique direction, from signal values of the plurality of peripheral pixels of the pixel of interest that are of the same color as the pixel of interest;

second direction determination unit adapted to determining, as the direction in which a pixel highly correlated with the signal value of the pixel of interest exists, one of the vertical and horizontal directions and one of a plurality of predetermined oblique directions, from the signal values of the plurality of peripheral pixels of the pixel of interest that are of a different color of the pixel of interest; and selection unit adapted to selecting the one of the vertical and horizontal direction determined by the second direction determination unit if the direction in which a pixel highly correlated with the signal value of the pixel of interest exists is determined to be the vertical or horizontal direction by the first direction determination unit, and selects the one of the plurality of oblique directions determined by the second direction determination unit if the direction in which a pixel highly correlated with the signal value of the pixel of interest exists is determined to be the oblique direction by the first direction determination unit.

4. The image processing apparatus according to claim 2, wherein the plurality of predetermined oblique directions are a 45-degree direction and a 135-degree direction.

5. An image capture apparatus comprising:
an image sensor having a color filter; and
the image processing apparatus according to claim 1,
wherein in an image captured by the image sensor, a signal value of a defective pixel in the image sensor is acquired by the image processing apparatus.

6. An image capture apparatus comprising:
an image sensor having a color filter; and
the image processing apparatus according to claim 1,
wherein the signal value calculated by the weighted addition unit in the image processing apparatus is used in color interpolation processing on a pixel of interest in an image captured by the image sensor.

7. A method for controlling an image processing apparatus for generating a signal value of a pixel of interest in an image, which is captured by an image sensor having a color filter, from signal values of a plurality of peripheral pixels of the pixel of interest, the method comprising:

a determination step of outputting a determination signal indicating a degree to which the pixel of interest is of an achromatic color based on a chroma signal corresponding to the pixel of interest;

an achromatic color direction determination step of determining a direction, in which a pixel highly correlated with the signal value of the pixel of interest exists, from the signal values of a plurality of pixels of a different color from the pixel of interest among the plurality of peripheral pixels of the pixel of interest, a first correction value generation step of generating the signal value of the pixel of interest by using a signal value of a pixel that exists in the direction determined in the achromatic color direction determination step among the plurality of peripheral pixels of the pixel of interest, a chromatic color direction determination step of determining a direction, in which a pixel highly correlated with the signal value of the pixel of interest exists, from signal values of a plurality of pixels of the same color as the pixel of interest and signal values of a plurality of pixels of a different color from the pixel of interest among the plurality of peripheral pixels of the pixel of interest;

a second correction value generation step of generating the signal value of the pixel of interest by using a signal value of a pixel that exists in the direction determined in the chromatic color direction determination step among the plurality of peripheral pixels of the pixel of interest; and a weighted addition step of performing weighted addition of the signal value generated in the first correction value generation step and the signal value generated in the second correction value generation step such that a weight of the signal value generated in the first correction value generation step is larger and a weight of the signal value generated in the second correction value generation step is smaller as the degree to which the pixel of interest is of an chromatic color indicated by the determination signal is higher, and calculating a final signal value of the pixel of interest.

8. A non-transitory computer-readable recording medium storing a program for causing a computer to function as the image processing apparatus according to claim 1.

* * * * *